US012264665B2

United States Patent
Ebeling et al.

(10) Patent No.: US 12,264,665 B2
(45) Date of Patent: Apr. 1, 2025

(54) MINIATURE PIEZOELECTRIC AIR PUMP TO GENERATE PULSATION-FREE AIR FLOW FOR PIPETTE APPARATUS PROXIMITY SENSING

(71) Applicant: Siemens Healthcare Diagnostics Inc., Tarrytown, NY (US)

(72) Inventors: Christopher P. Ebeling, Newfoundland, NJ (US); Arnaud Besse-Bergier, Saint-Herblain (FR); Yu Zhou, Ridgewood, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 238 days.

(21) Appl. No.: 17/251,767

(22) PCT Filed: Jul. 1, 2019

(86) PCT No.: PCT/US2019/040146
§ 371 (c)(1),
(2) Date: Dec. 11, 2020

(87) PCT Pub. No.: WO2020/010002
PCT Pub. Date: Jan. 9, 2020

(65) Prior Publication Data
US 2021/0115912 A1 Apr. 22, 2021

Related U.S. Application Data

(60) Provisional application No. 62/693,572, filed on Jul. 3, 2018.

(51) Int. Cl.
*F04B 43/04* (2006.01)
*F04B 45/047* (2006.01)
(Continued)

(52) U.S. Cl.
CPC .......... *F04B 43/046* (2013.01); *F04B 45/047* (2013.01); *F04B 49/06* (2013.01); *G01N 35/1011* (2013.01)

(58) Field of Classification Search
CPC ...... F04B 43/046; F04B 43/06; F04B 45/047; F04B 49/06
See application file for complete search history.

(56) References Cited

U.S. PATENT DOCUMENTS 3,494,191 A 2/1970 Cawley et al.
4,846,003 A 7/1989 Marquiss
(Continued)

FOREIGN PATENT DOCUMENTS

CN 1534298 A 10/2004
CN 203250984 U 10/2013
(Continued)

OTHER PUBLICATIONS

Extended EP Search Report dated Jul. 22, 2021 of corresponding European Application No. 19830362.0, 4 Pages.
(Continued)

*Primary Examiner* — Connor J Tremarche

(57) ABSTRACT

A sample probe system has a sample probe assembly, an air supply assembly, and a control system. The sample probe assembly has a transducer and a sample probe. The air supply assembly has a piezoelectric pump configured to supply an air flow to the sample probe assembly such that the air flow exits the sample probe. The control system determines a relative location of the sample probe based on pressure changes in the air flow detected by the transducer.

17 Claims, 7 Drawing Sheets

(51) Int. Cl.
   *F04B 49/06* (2006.01)
   *F04B 49/10* (2006.01)
   *G01N 35/10* (2006.01)

(56) References Cited

U.S. PATENT DOCUMENTS

| | | | |
|---|---|---|---|
| 5,750,881 | A | 5/1998 | Dorenkott et al. |
| 6,158,269 | A * | 12/2000 | Dorenkott ............... G01N 1/38 |
| | | | 422/562 |
| 6,943,030 | B2 | 9/2005 | Gebrian et al. |
| 7,258,480 | B2 | 8/2007 | Dunfee et al. |
| 2002/0012614 | A1 | 1/2002 | Koide et al. |
| 2004/0048393 | A1 * | 3/2004 | Colin ................ G01N 35/1016 |
| | | | 436/180 |
| 2005/0074363 | A1 | 4/2005 | Dunfee |
| 2005/0219302 | A1 | 10/2005 | Vogeley |
| 2005/0226782 | A1 | 10/2005 | Reed et al. |
| 2005/0282054 | A1 * | 12/2005 | Ishida ................. H01M 8/1009 |
| | | | 429/414 |
| 2006/0152999 | A1 | 7/2006 | Dunfee et al. |
| 2006/0239860 | A1 | 10/2006 | Evers et al. |
| 2007/0020763 | A1 | 1/2007 | Ingenhoven et al. |
| 2007/0216256 | A1 * | 9/2007 | Vogeley ................ H01L 41/042 |
| | | | 310/317 |
| 2008/0182340 | A1 * | 7/2008 | Lemmo ................. B01L 3/0289 |
| | | | 436/180 |
| 2009/0232681 | A1 * | 9/2009 | Ham ..................... F04B 17/003 |
| | | | 417/322 |
| 2009/0232682 | A1 | 9/2009 | Hirata et al. |
| 2010/0011889 | A1 | 1/2010 | Lemmo |
| 2011/0054505 | A1 * | 3/2011 | Kojima ................ B41J 2/14274 |
| | | | 222/282 |
| 2014/0069420 | A1 * | 3/2014 | Richter ..................... A61L 9/12 |
| | | | 239/305 |
| 2014/0220693 | A1 | 8/2014 | Yamazaki et al. |
| 2018/0100495 | A1 * | 4/2018 | Tanaka ..................... F04B 43/04 |
| 2019/0067555 | A1 * | 2/2019 | Okaguti ................... F04B 49/06 |
| 2020/0378373 | A1 * | 12/2020 | Tanaka .................. F04B 17/003 |

FOREIGN PATENT DOCUMENTS

| | | |
|---|---|---|
| DE | 42 09 885 A1 | 10/1992 |
| EP | 3 018 477 A1 | 5/2016 |
| FR | 2777085 A1 | 10/1999 |
| JP | H1-227064 A | 9/1989 |
| JP | H9-32723 A | 2/1997 |
| JP | H9-54023 A | 2/1997 |
| JP | H4-296655 A | 10/1999 |
| JP | 2000-97952 A | 4/2000 |
| JP | 2002-510056 A | 4/2002 |
| JP | 2002-307003 A | 10/2002 |
| JP | 2008-119652 A | 5/2008 |
| JP | 2008-539440 A | 11/2008 |
| JP | 2009-190010 A | 8/2009 |
| JP | 2010-287650 A | 12/2010 |
| JP | 2014-106073 A | 6/2014 |
| JP | 2014-516659 A | 7/2014 |
| JP | 2016-97209 A | 5/2016 |
| WO | 2018/074193 A1 | 4/2018 |

OTHER PUBLICATIONS

PCT International Search Report and Written Opinion dated Oct. 1, 2019 (9 Pages).

* cited by examiner

MINIATURE PIEZOELECTRIC AIR PUMP TO GENERATE PULSATION-FREE AIR FLOW FOR PIPETTE APPARATUS PROXIMITY SENSING

CROSS-REFERENCE TO RELATED APPLICATIONS

This application claims priority to U.S. Provisional Application Ser. No. 62/693,572 filed on Jul. 3, 2018, the contents of which is incorporated herein by reference in its entirety.

TECHNICAL FIELD

The present invention relates generally to a piezoelectric air pump, and, more particularly, to a miniature piezoelectric air pump to generate pulsation-free air flow for pipette apparatus proximity sensing.

BACKGROUND

Various types of analytical tests related to patient diagnosis and therapy can be performed by analysis of a liquid sample taken from a patient's bodily fluids, or abscesses. These assays are typically conducted with automated clinical analyzers onto which tubes or vials containing patient samples have been loaded. The analyzer extracts a liquid sample from the vial and combines the sample with various reagents in special reaction cuvettes or tubes (referred to generally as reaction vessels). Usually the sample-reagent solution is incubated or otherwise processed before being analyzed. Analytical measurements are often performed using a beam of interrogating radiation interacting with the sample-reagent combination, for example, turbidimetric, fluorometric, absorption readings, or the like. The measurements allow determination of end-point or rate values from which an amount of analyte related to the health of the patient may be determined using well-known calibration techniques.

Some analyzers and certain pipetting apparatuses rely on the Bernoulli principle to sense objects such as disposable tips and liquid free surfaces in the automated processes associated with liquid sample testing. To sense an object using the Bernoulli principle, the sample probe must have a continuous supply of air flowing through it. As the sample probe nears an object, a pressure transducer senses the conversion of the supply flow's kinetic energy to potential energy. Because the sensing algorithms must detect the supply flow's conversion of kinetic energy to potential energy for object detection, of pressure pulsations must be minimized.

One current method which relies on the Bernoulli principle includes a rotary vane pump to supply air to the probe during object sensing. As each vane passes the ports in the pump housing, large pressure pulsations are created. Pumps with one or more internal valves to control the direction of flow may also produce pulsated air flow. An external pulsation dampener is sometimes used to condition pressure spikes and smooth the supply flow to the sample probe. Smooth and steady flow is required for the control system to reliably detect if a sample probe is approaching an object.

Although some conventional systems attempt to address the problem of generating a pulsation-free flow, they are generally not cost effective. For example, U.S. Pat. No. 3,494,191 describes an automatic control system for sensing and controlling liquid surface levels utilizing a vertically movable nozzle which issues a fluid downwardly in a stream against the surface being sensed. However, the disclosure only mentions that a constant pressure supply is needed and does not describe how to generate smooth and steady air flow. U.S. Pat. No. 6,158,269 describes another current method in an apparatus for aspirating and dispensing sample fluids. To achieve a steady and smooth supply of air flow at the distal end of the probe, a pulsation damper in the form of coiled tubing or a serpentine block, and a vent tube are needed. This addition of the pulsation damper complicates the assembly and adds unnecessary cost.

The present disclosure is directed to overcoming this and other problems of the prior art.

SUMMARY

Embodiments of the present invention address the problems of the prior art with an air supply system having a piezoelectric pump that may be used in conjunction with a sample probe system in order to perform proximity or location sensing of a sample probe while providing smooth, laminar flow in a cost-effective and compact manner.

In some embodiments, a sample probe system includes a sample probe assembly, an air supply assembly, and a control system. The sample probe assembly includes a transducer and a sample probe. The air supply assembly includes a piezoelectric pump configured to supply an air flow to the sample probe assembly such that the air flow exits the sample probe. The control system determines a relative location of the sample probe based on pressure changes in the air flow detected by the transducer.

In other embodiments, a sample probe system includes a sample probe assembly, an air supply assembly, and a control system. The sample probe assembly includes a transducer and a sample probe. The air supply assembly includes a piezoelectric pump configured to supply an air flow to the sample probe assembly such that the air flow exits the sample probe. The piezoelectric pump includes an outer housing comprising an inlet opening and an outlet nozzle, an intake channel defined in the outer housing fluidly connected to the inlet opening, an inner pump positioned in the outer housing and configured to draw air in from the intake channel and expel air out of the outlet nozzle to produce the air flow to the sample probe assembly, the inner pump including a piezoelectric element. The control system applies a voltage to the piezoelectric element in order to produce the air flow and determine a relative location of the sample probe based on pressure changes in the air flow detected by the transducer.

In other embodiments, a chemical analyzer includes a reaction carousel configured to support a plurality of containers, a sample fluid tube transport system for transporting sample fluid tubes, a liquid sampling probe configured to aspirate and dispense portions of sample fluid from the sample fluid tubes to the plurality of containers supported by the reaction carousel, and a control computer configured to perform automated control operations within the chemical analyzer. The liquid sampling probe includes a sample probe assembly and an air supply assembly. The sample probe assembly includes a transducer and a sample probe. The air supply assembly includes a piezoelectric pump configured to supply an air flow to the sample probe assembly such that the air flow exits the sample probe. The control computer is configured to determine a relative location of the sample probe based on pressure changes in the air flow detected by the transducer.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Embodiments of the present disclosure include a piezoelectric pump incorporated into a sample probe system. The piezoelectric pump produces pulsation-free air flow and thus allows a control system to reliably detect a location of a sample probe using the Bernoulli principle. In some embodiments, the piezoelectric pump operates without any internal valves, as such valves may cause turbulence or otherwise non-laminar flow. The piezoelectric pump may operate through periodic or aperiodic oscillations of a piezoelectric material. The sample probe system may further include feedback control of the piezoelectric pump, thereby allowing the system to compensate for manufacturing biases or altitude and/or providing a feedback system which can alert a user that there is a problem, such as the need for a filter change or if a clog is present.

Figure 1:
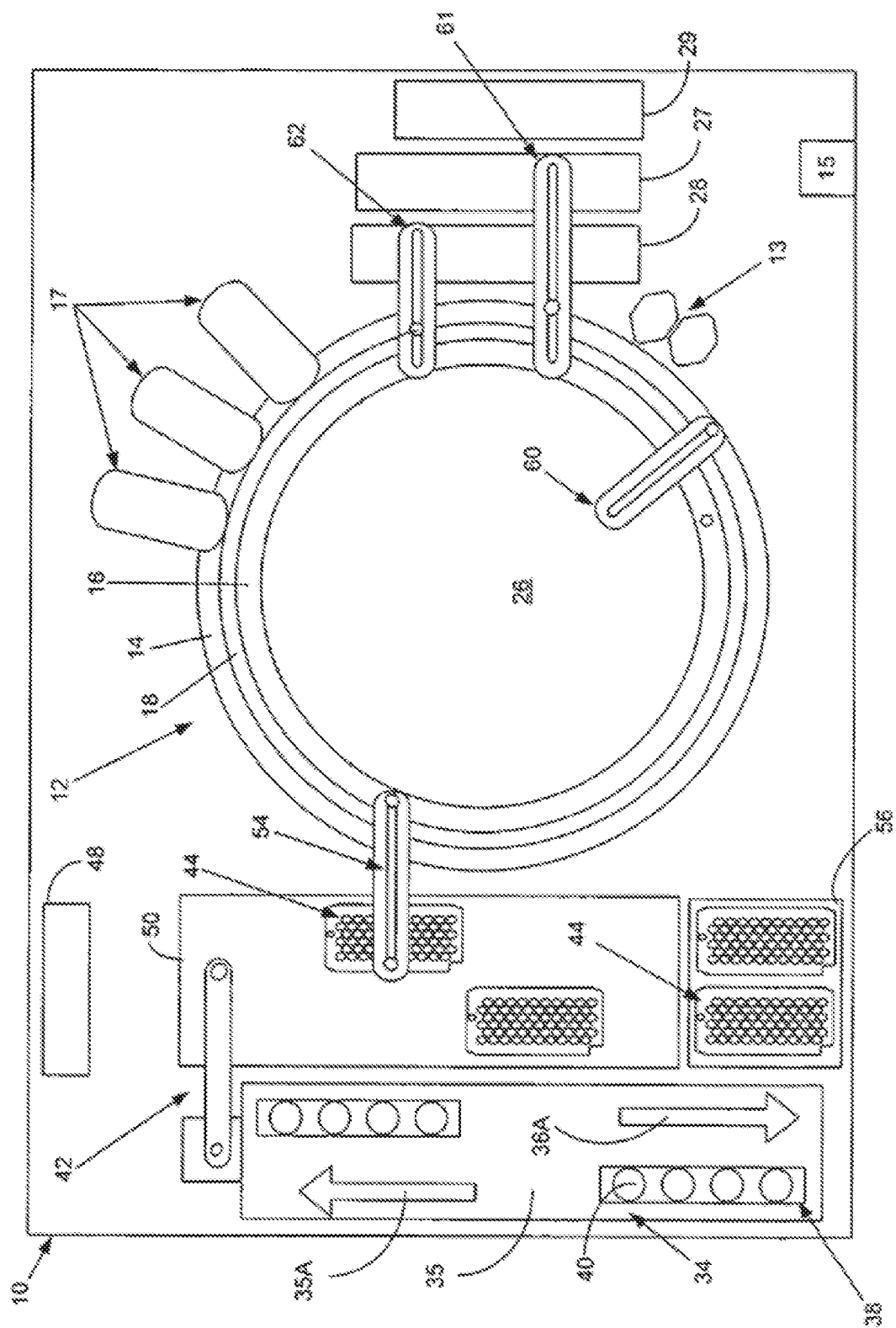
FIG. 1 is a top view of an exemplary chemical analyzer.
Figure 2:
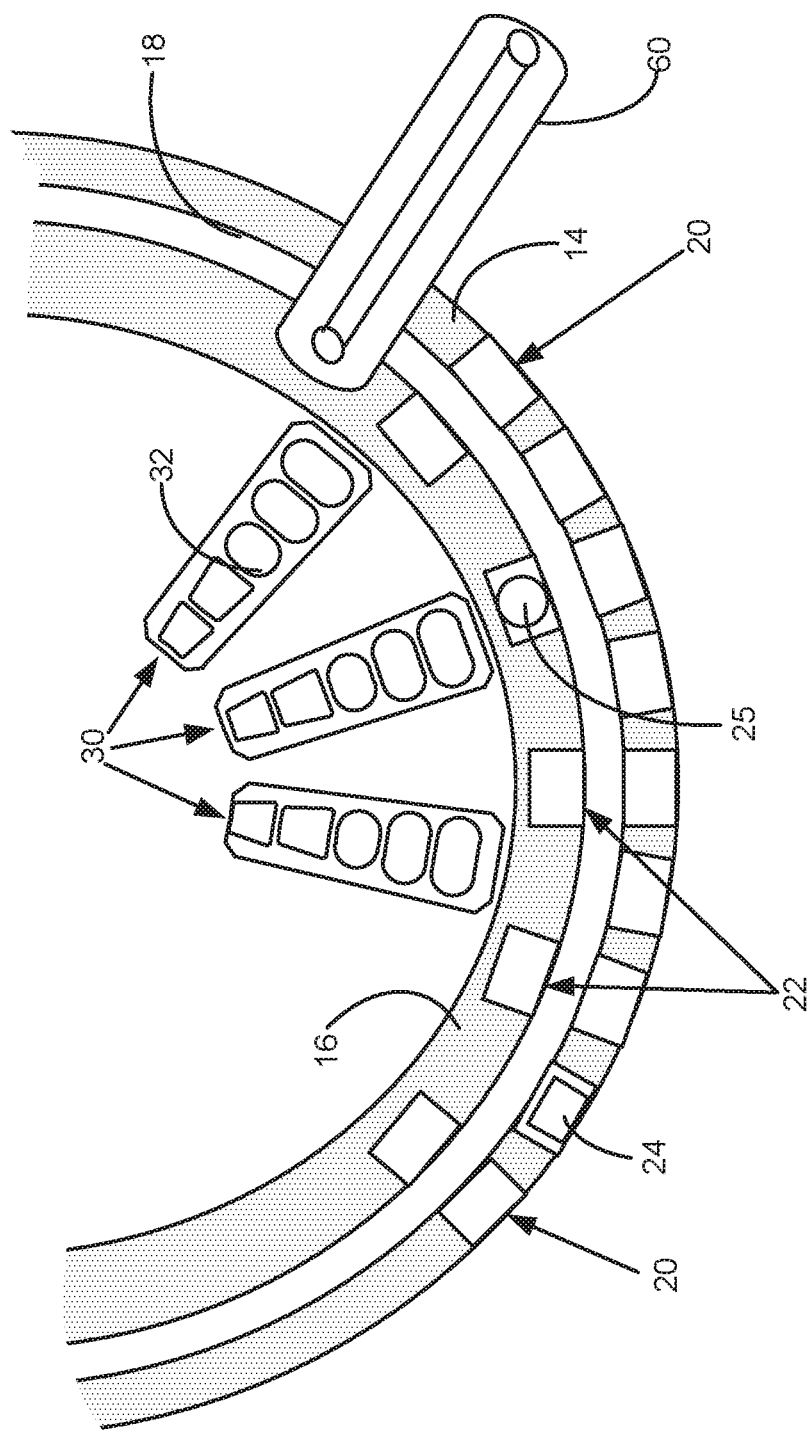
FIG. 2 is a top view of a portion of a carousel for transporting reaction vessels and cuvettes for use with certain embodiments.
Figure 2B:
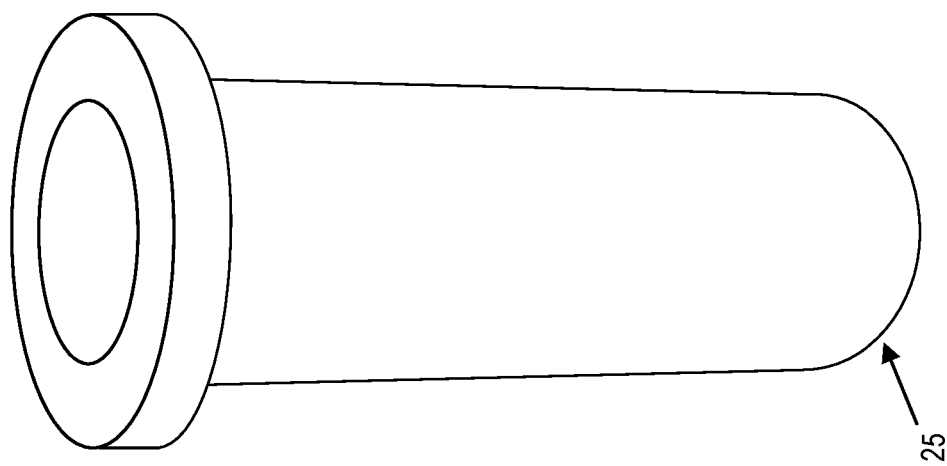
FIG. 2B is a perspective view of another type of reaction vessel for use with certain embodiments.
Figure 2A:
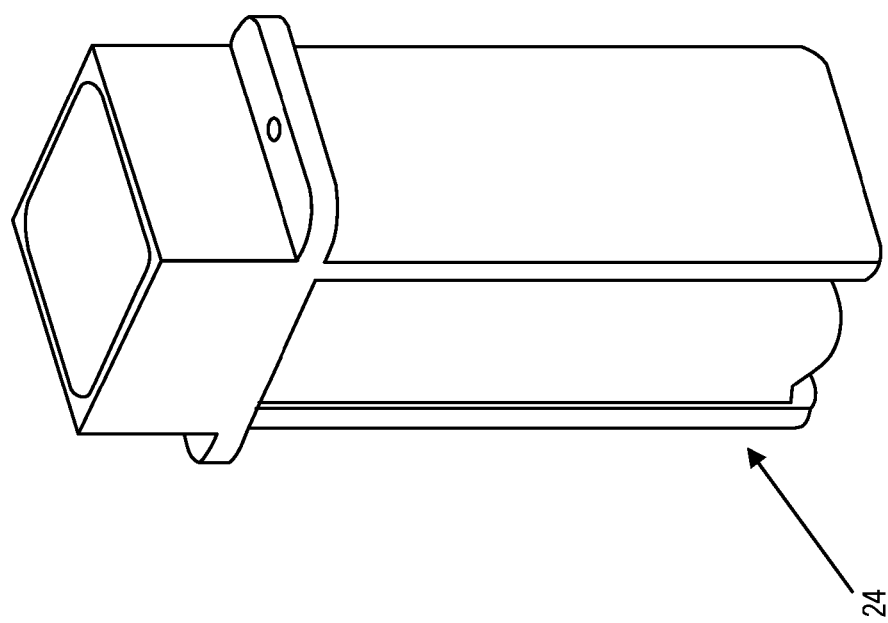
FIG. 2A is a perspective view of a cuvette for use with certain embodiments.

FIG. 1, taken with FIG. 2, shows schematically the elements of an automatic chemical analyzer 10 in which the present invention may be advantageously practiced, which may include, for instance the chemical analyzer described in U.S. Pat. No. 7,258,480, the entirety of which is incorporated herein by reference. Analyzer 10 comprises a reaction carousel 12 supporting an outer carousel 14 having cuvette ports 20 formed therein and an inner carousel 16 having vessel ports 22 formed therein, the outer carousel 14 and inner carousel 16 being separated by an open groove 18. Cuvette ports 20 are adapted to receive a plurality of reaction cuvettes 24, as seen in FIG. 2A, that contain various reagents and sample liquids for conventional clinical and immunoassay assays. Vessel ports 22 can be adapted to receive a plurality of reaction vessels 25, as shown in FIG. 2B, that contain specialized reagents for ultra-high sensitivity luminescent immunoassays. While cuvettes and reaction vessels can have differing shapes, as used herein, the methods for mixing can be applied to the contents of reaction vessels 25 or cuvettes 24, and the terms reaction vessels and cuvettes should be considered broadly and interchangeably. Reaction vessels can include, for instance, cuvettes, vials, tubes, or other suitable vessels for mixing reagents and solutions.

Reaction carousel 12 is rotatable using stepwise movements in a constant direction, the stepwise movements being separated by a constant dwell time during which reaction carousel 12 remains stationary and computer controlled assay operational devices 13, such as sensors, reagent add stations, mixing stations, and the like, operate as needed on an assay mixture contained within a cuvette 24.

Analyzer 10 is controlled by software executed by a computer 15 for performing assays conducted by various analyzing means 17 (e.g., detection units) within analyzer 10. Analyzing means can include, for instance, one or more photometers, turbidimeters, nephelometers, electrodes, electromagnets, and/or LOCI® readers for interpreting the results of reactions within the reaction vessels or cuvettes. It should be understood that each of the steps described herein can be performed directly by or in response to programming instructions executed on one or more processor(s), such as computer 15, available to analyzer 10. These software instructions can be stored for execution via any conventional means including a hard drive, solid state memory, optical disk, flash memory, or the like.

As seen in FIG. 1, a bi-directional incoming and outgoing sample fluid tube transport system 34 comprises a mechanism for transporting sample fluid tube racks 38 containing open sample fluid containers such as sample fluid tubes 40 from a rack input load position at a first end of the input lane 35 to the second end of input lane 35 as indicated by open arrow 35A. Liquid specimens contained in sample tubes 40 are identified by reading bar coded indicia placed thereon using a conventional bar code reader to determine, among other items, a patient's identity, tests to be performed, if a sample aliquot is to be retained within analyzer 10, and, if so, for what period of time. It is also common practice to place bar coded indicia on sample tube racks 38 and employ a large number of bar code readers installed throughout analyzer 10 to ascertain, control, and track the location of sample tubes 40 and sample tube racks 38.

A liquid sampling probe 42 is located proximate the second end of the input lane 35 and is operable to aspirate aliquot portions of sample fluid from sample fluid tubes 40 and to dispense an aliquot portion of the sample fluid into one or more of a plurality of vessels in aliquot vessel array 44. This provides a quantity of sample fluid to facilitate assays and to provide for a sample fluid aliquot to be retained by analyzer 10 within an environmental chamber 48. After sample fluid is aspirated from all sample fluid tubes 40 on a rack 38 and dispensed into aliquot vessels in array 44 and maintained in an aliquot vessel array storage and transport system 50, rack 38 may be moved, as indicated by open arrow 36A, to a front area of analyzer 10 accessible to an operator so that racks 38 may be unloaded from analyzer 10.

Sample aspiration probe 54 is controlled by computer 15 and is adapted to aspirate a controlled amount of sample from individual aliquot vessels in array 44 positioned at a sampling location within a track (not shown) and is then shuttled to a dispensing location where an appropriate amount of aspirated sample is dispensed into one or more cuvettes 24 for testing by analyzer 10 for one or more analytes. After sample has been dispensed into reaction cuvettes 24, conventional transfer means move aliquot vessel arrays 44, as required, within aliquot vessel array storage and dispensing module 56 between aliquot vessel array transport system 50, environmental chamber 48, and a disposal area (not shown).

Temperature-controlled storage areas or servers 26, 27, and 28, contain an inventory of multi-compartment elongate reagent cartridges 30 loaded into the system via input tray 29, such as those described in U.S. Pat. No. 6,943,030, incorporated herein by reference, containing reagents in wells 32 perform a number of different assays. Computer 15 can control and track the motion and placement of the reagent cartridges 30. Reagents from servers 26, 27, and 28 can be handled by one or more reagent probe arms, 60, 61, and 62.

The liquid sampling probe 42 of the automatic chemical analyzer 10 is one example of a sampling probe which may be used to approach and collect a liquid sample. In these and other similar pipette apparatuses, proximity sensing is used in order to detect a relative location of the sampling probe with respect to the sample. For example, proximity sensing may be used to determine when a disposable tip has reached a surface of a sample such that a probe plunger can be activated to collect a predetermined amount of the sample. In order to perform proximity sensing, a sample probe system may include an air pump for liquid level sensing. Air flow is blown from the air pump through a sample probe manifold to a pressure transducer and finally to a disposable tip which can purge pumped air flow into the liquid. The system is able to sense that it has approached a new medium when it detects a rapid change in pressure reading due to the change of dynamic pressure to hydrostatic pressure (e.g., the flow of has been interrupted by the sample or other material).

Figure 3:
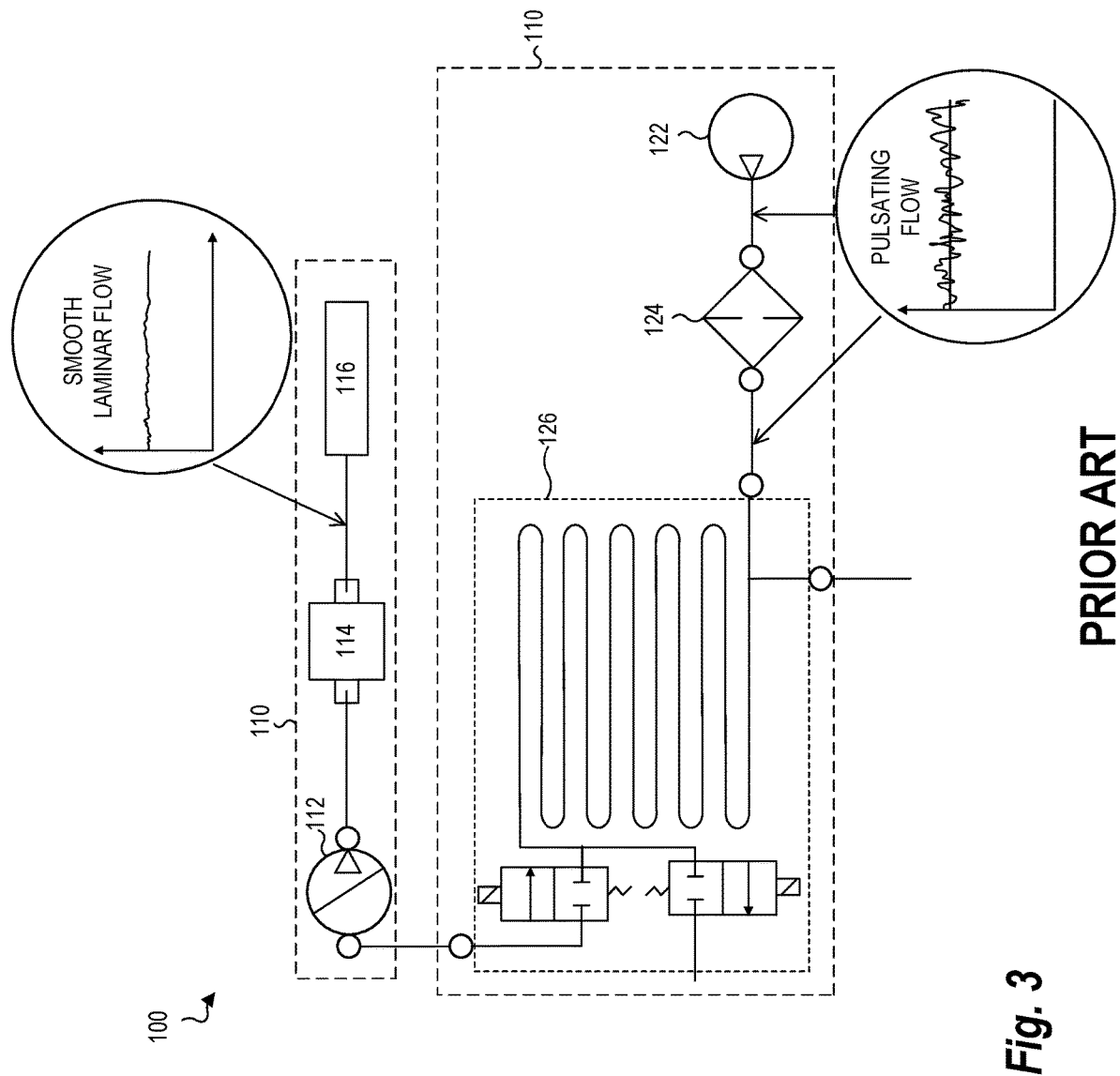
FIG. 3 is an example of a conventional sample probe system.

FIG. 3 is a schematic diagram of a conventional sample probe system 100. The sample probe system 100 includes a sample probe assembly 110 and an air supply assembly 120. The air supply assembly 120 supplies an air flow to the sample probe assembly 110. As the sample probe assembly 110 approaches a sample, the air flow is interrupted and a contact point or distance to the sample can be determined.

The sample probe assembly 110 includes, for example, a sample pump 112, a transducer 114, and a sample probe 116. The sample pump 112 is a pump or valve which controls the receipt and delivery of a sample into the sample probe 116. For example, the sample pump 112 may control a sample plunger which draws a liquid sample into a tip of the sample probe 116 through a linear plunger movement and expels the liquid sample through a reverse action. The transducer 114 is connected to a detection system (not shown) and configured to supply a signal based on a change in the air flow at the sample probe 116. The term transducer is generally used in this case to describe any sensor (e.g., pressure sensor) which is configured to detect a change in the air flow from the sample probe 116.

The air supply assembly 120 includes, for example, an air pump 122, a filter 124, and a pulse dampener manifold 126. The air pump 122 is a mechanism configured to produce an air flow. The air pump 122 may include, for example, a rotary vane pump having a rotating blade and one or more valves which control the flow out of the air pump 122. The air flow exits the air pump 122 and flows through the filter 124 which helps prepare the air flow and remove unwanted particles. As shown in FIG. 1, the air flow exiting the air pump 122 and the filter 124 is a pulsating flow. This may be caused, for example, by the nature of a rotating blade to produce an uneven flow which pulsates along with the rotation of each vane. Moreover, the use of one or more valves interrupts the flow at certain times and inhibits a smooth flow.

The pulse dampener manifold 126 is present in the air supply assembly 120 in order to reduce the effect of the pulsating flow which exits the air pump 122 and filter 124. The pulse dampener manifold 126 may be, for example, a long tube or conduit which allows the air flow to become more smooth and reduces the pressure oscillations as the air flows further downstream. If the pulsating flow were allowed to reach the sample probe assembly 110, the transducer 114 may obtain incorrect readings and the detection system may not reliably detect the location of the sample probe 116 with respect to a sample. The pulse dampener manifold 126 may include one or more valves and one or more vents which remove the pressure pulsations from the flow and create a smooth laminar flow for the sample probe assembly 110.

Embodiments of the present disclosure include a piezoelectric pump which produces pulsation-free flow and thereby eliminates the need for a pulse dampener or similar element. The piezoelectric pump can supply constant pressure flow and feed it directly into the sample probe assembly. This simplifies the sample probe system and reduces costs. Because the piezoelectric pump is able to operate at variable voltages, a logic control loop may be incorporated within the system software in order to tune the piezoelectric pump's operation and remove any biases caused by manufacturing, altitude, or other factor.

Figure 4:
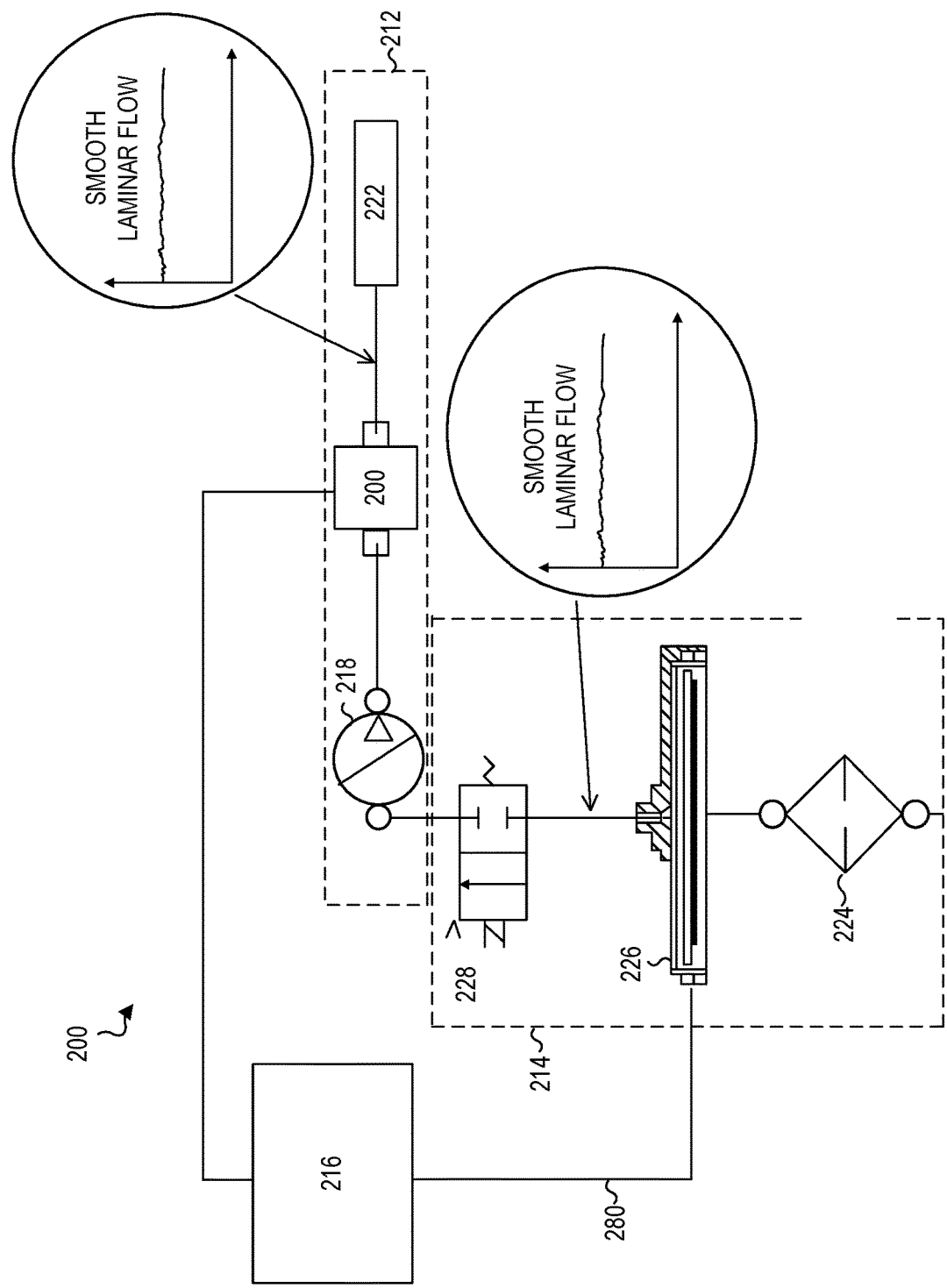
FIG. 4 is an exemplary sample probe system, consistent with disclosed embodiments.

FIG. 4 is a schematic diagram of an exemplary sample probe system 200, according to disclosed embodiments of the present invention. The sample probe system 200 includes a sample probe assembly 212, an air supply assembly 214, and a control system 216. The sample probe assembly 212 includes a sample pump 218, a transducer 220, and a sample probe 222. The sample probe 222 may include, for example, a disposable tip and a probe plunger configured to collect a sample in a manner known in the art. The sample pump 218 controls the probe plunger in order to draw in and/or expel a sample liquid into and out of the sample probe 222. The air supply assembly 214 provides a pulsation-free air flow to the sample probe assembly 212 such that the transducer 220 can reliably provide signals to the control system 216 regarding sensing of the relative location of the sample probe 222 (e.g., the sample probe 222 contacting a sample). The transducer 220 may be any sensing device (e.g., a pressure sensor) which is configured to detect a change in the flow at the tip of the sample probe 222. For example, the transducer 220 may detect a static pressure spike at the sample probe 222. The static pressure spike indicates that the sample probe 222 is approaching a surface (e.g., a liquid surface of a sample). The transducer 220 provides signals to the control system 216. The control system 216 is configured to analyze the signals to determine the positioning of the sample probe 222 with respect to a liquid sample, for example.

In some embodiments, the air supply assembly 214 includes a filter 224, a piezoelectric pump 226, and a pump valve 228. The piezoelectric pump 226 is configured to supply constant pressure air flow to the pump valve 228. The filter 224 is positioned in the air supply assembly 214 in order to clean the air flow prior to it being supplied to the sample probe assembly 212 (e.g., remove air particulate). The pump valve 228 is configured to selectively permit the flow of air to reach the sample probe assembly 212. For example, the pump valve 228 is configured to stop the air flow to the sample probe assembly 212 when the sample pump 218 is drawing, carrying, and/or expelling a liquid sample. The pump valve 228 may additionally or alternatively include a bleed valve 229 configured to allow pressure to bleed from the system. The piezoelectric pump 226 is a bladeless pump which relies on the ability of piezoelectric materials to produce shape and configuration changes in a solid material through the application of an electrical voltage across to the material. The piezoelectric pump 226 may or may not include an internal valve. Instead, the piezoelectric pump 226 is aerodynamically designed to be more efficient during air expulsion and more resistive during suction.

Figure 5A:
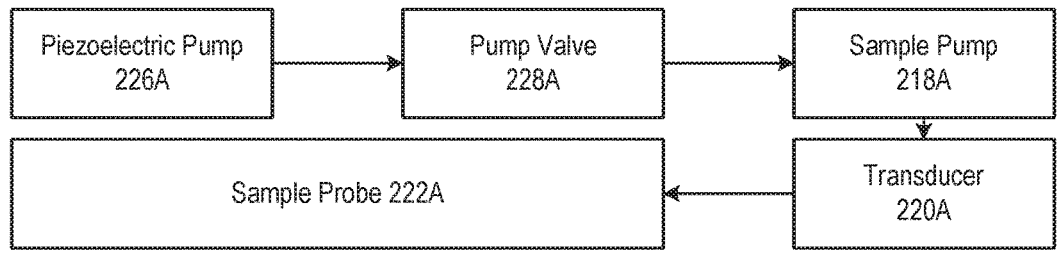
FIGS. 5A-5C are exemplary schematic diagrams of embodiments of the sample probe system of FIG. 4.
Figure 5B:
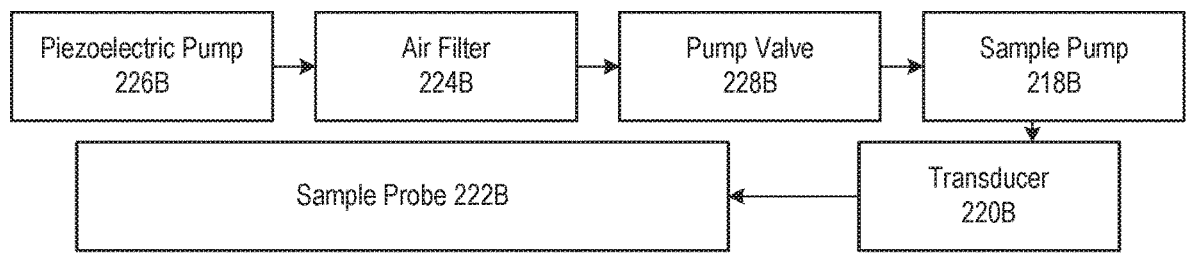
Figure 5C:
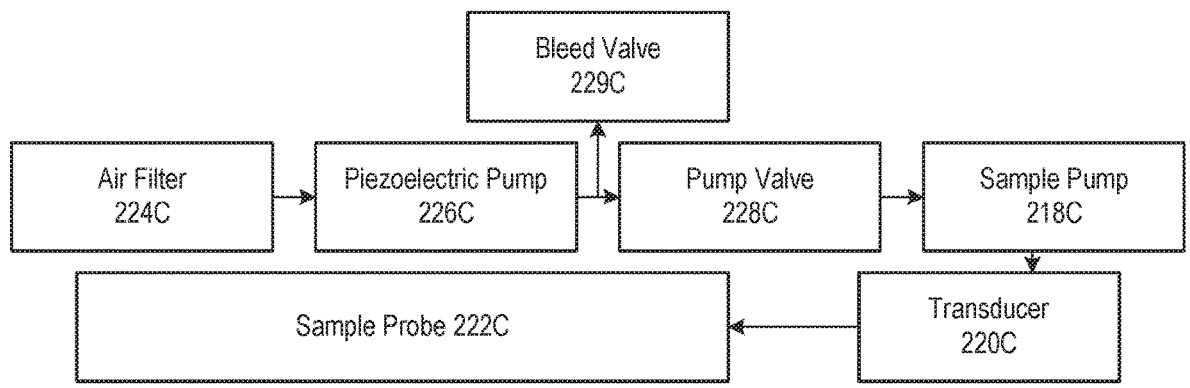

FIGS. 5A-5C include schematic illustrations of exemplary embodiments of the sample probe system 200. FIG. 5A illustrates a sample probe system 200A which includes a piezoelectric pump 226A, a pump valve 228A, a sample pump 218A, a transducer 220A, and a sample probe 222A. The sample probe 222A is comprised of a disposable tip and a sample probe plunger. In this embodiment, the sample probe system 200A omits a bleed valve and filter.

FIG. 5B illustrates a sample probe system 200B which includes a piezoelectric pump 226B, an air filter 224B, a pump valve 228B, a sample pump 218B, a transducer 220B, and a sample probe 222B. This embodiment includes the air filter 224B that removes unwanted particles from the air flow. The air filter 224B is positioned downstream from the piezoelectric pump 226B in this embodiment.

FIG. 5C illustrates a sample probe system 200C which includes an air filter 224C, a piezoelectric pump 226C, a bleed valve 229C, a pump valve 228C, a sample pump 218C, a transducer 220C, and a sample probe 222C. This embodiment includes both the air filter 224C and the bleed valve 229C. In this embodiment, the air filter 224C is positioned upstream from the piezoelectric pump 226C. This configuration may help to provide a more compact configuration by filtering the air on an inlet side of the piezoelectric pump 226C. The positioning of the air filter 224C also allows for the air filter 224C to be more easily changed. In this embodiment, the air filter 224C, piezoelectric pump 226C, bleed valve 229C, and pump valve 228C may be combined in a single, compact manifold. The use of the additional bleed valve 229C adds an additional component, but lowers risk of a leak or damage by allowing internal pressure to be more precisely controlled.

In each of the sample probe systems 200A, 200B, 200C, the low number of components reduces cost over conventional air pumps and provide a simple and efficient means to produce a smooth laminar flow which may be provided directly to a sample probe assembly. The air filter can be arranged either downstream or upstream from the piezoelectric pump or omitted altogether. A bleed valve may be included, but is not a necessary component. The various configurations may be tailored to the specific application of the sample probe system.

Returning to FIG. 4, the control system 216 is electronically connected to the transducer 220 and is configured to receive signals from the transducer 220 which are indicative of a change in the air flow from the sample probe 222 (e.g., a change in static pressure). In this manner, the control system 216 is configured to detect the location of the sample probe 222 with respect to a sample. For example, the control system 216 may be calibrated to a baseline or threshold flow rate or pressure value and detect deviations which are indicative of a location of the sample probe 222 with respect to a surface of a liquid sample.

In some embodiments, the control system 216 is also configured to apply a voltage to the piezoelectric pump 226. For example, the control system 216 may apply a voltage waveform to the piezoelectric pump 226, thereby powering the pump and producing the air flow. The voltage waveform may be periodic (e.g., sinusoidal with a consistent amplitude variation and frequency) or aperiodic (e.g., inconsistent amplitude and frequency). The control system 216 may be configured to vary the voltage waveform to control the air flow produced by the piezoelectric pump 226 (e.g., increase or decrease the flow rate). For example, the control system 216 may also include a feedback control 280 which connects to the piezoelectric pump 226. The feedback control 280 is incorporated into the control system 216 as a software control which tunes the operation of the piezoelectric pump 226 by varying the voltage waveform applied to the piezoelectric pump 226.

Figure 6:
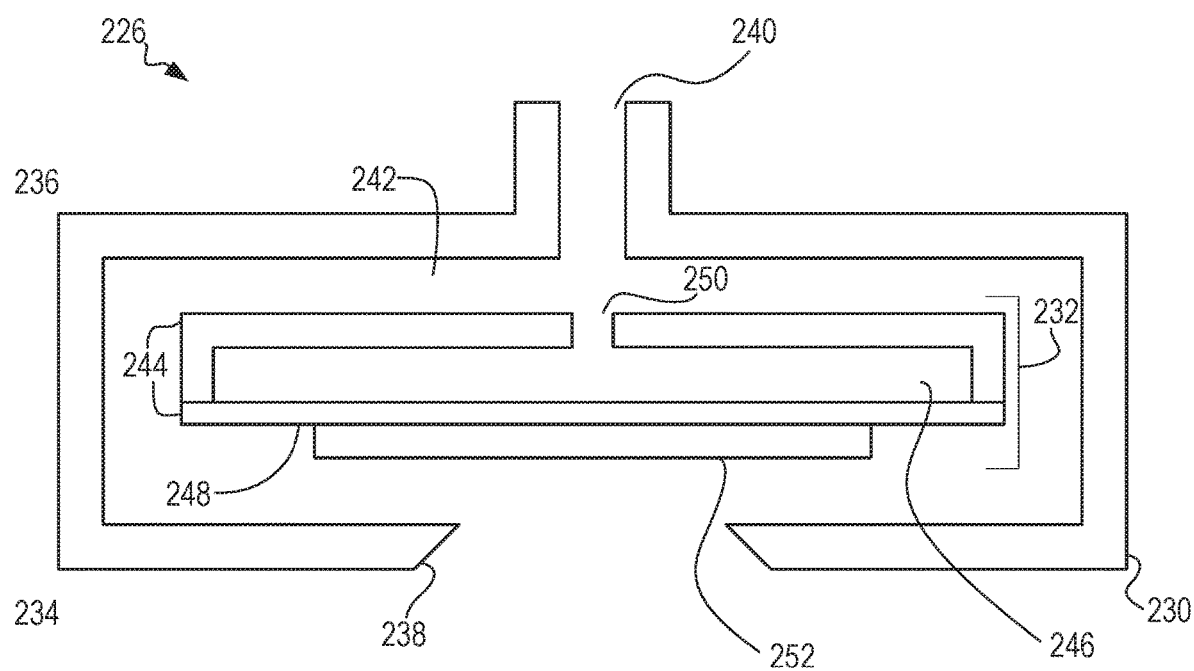
FIG. 6 is a cross-sectional illustration of an exemplary piezoelectric pump, consistent with disclosed embodiments.

FIG. 6 is a cross-sectional view of an exemplary embodiment of the piezoelectric pump 226. The piezoelectric pump 226 includes an outer housing 230 and an inner pump 232. The outer housing 230 includes an inlet side 234 and an outlet side 236. The outer housing 230 defines an inlet opening 238 at the inlet side 234, an outlet nozzle 240 at the outlet side 236, and an intake channel 242. The intake channel 242 connects the inlet opening 238 to the outlet nozzle 240. The inlet opening 238 supplies air to the intake channel 242 and the inner pump 232 acts to expel the air out of the outlet nozzle 240. The inlet opening 238 may be sized and configured to provide a smooth flow to the intake channel 242. For example, the inlet opening 238 may include tapered edges which help to inhibit turbulence.

The inner pump 232 is positioned within the outer housing 230 and includes a plurality of walls 244 that define an air chamber 246. The plurality of walls 244 include a diaphragm wall 248 which is formed of a flexible material and which preferably forms a boundary of the air chamber 246 on the inlet side 234 of the outer housing 230, opposite the outlet nozzle 240. The plurality of walls 244 further include an aperture 250, which connects the intake channel 242 to the air chamber 246. The aperture 250 is preferably positioned on the outlet side 236 of the outer housing 230, opposite the inlet opening 238 and between the diaphragm wall 248 and the outlet nozzle 240. The inner pump 232 further includes a piezoelectric element 252. The piezoelectric element 252 may be attached to the diaphragm wall 248. In some embodiments, the piezoelectric element 252 may form the diaphragm wall 248.

The piezoelectric element 252 may be any piezoelectric material that is configured to expand and contract based on an input voltage supplied through an electrical connection. For example, the piezoelectric element 252 may contract when a predetermined voltage is applied and expand back to an original size when the predetermined voltage is removed. The diaphragm wall 248 is configured to flex as a result of the piezoelectric element 252 expanding and contracting. In particular, due to the diaphragm wall 248 being attached to the piezoelectric element 252, the a contraction of the piezoelectric element 252 may cause the diaphragm wall 248 to flex in order to move with the contracting piezoelectric element 252. When the piezoelectric element 252 expands, the diaphragm wall 248 returns to its rest position. The movement and/or flexing of the diaphragm wall 248 with the contraction and expansion of the piezoelectric element causes the air chamber 246 to change in volume. For example, a volume of the air chamber 246 may be greater when the piezoelectric element 252 is in a contracted position and smaller when the piezoelectric element 252 is in an expanded position. The repeated movement of the diaphragm wall 248 thus produces a pumping action which draws air from the intake channel 242 through the aperture 250 into the air chamber 246 upon contraction of the piezoelectric element 252 and expels the air out of the air chamber 246 and ultimately out of the outlet nozzle 240 upon expansion of the piezoelectric element 252.

The electrical connection is configured to provide a periodic electrical voltage to the piezoelectric element 252 in order to induce a repeated movement of the diaphragm wall 248 and thus a pumping action which produces a constant stream of air through the outlet nozzle 240. According to a disclosed embodiment, the piezoelectric element 252 is an ultrasonic pump which receives the input voltage from the electrical connection at a frequency greater than 20 kHz. The ultrasonic pumping action causes the ejected flow through the outlet nozzle 240 to be composed of small volume, high frequency micro pulses that result in pulsation-free flow.

As shown in FIG. 6, the piezoelectric pump 226 may be formed as a rectangular element having a rectangular cross-section of the outer housing 230. The plurality of walls 244 forming the inner pump 232 may also be formed such that the air chamber 246 is also rectangular. In one embodiment, the outer housing 230 has square dimensions of 20 mm×20 mm and a height of 1.5 mm-2 mm (e.g., 1.85 mm).

The intake channel 242 surrounds the inner pump 232 and delivers air to the aperture 250 from the inlet opening 238. The inlet opening 238 is preferably larger than the outlet nozzle 240 such that the intake channel 242 is more easily supplied with air through the inlet opening 238, thereby resisting intake flow backward through the outlet nozzle 240. In this way, a steady-state flow is generated in which air is pushed outward through the outlet nozzle 240 by air which is expelled from the air chamber 246 without drawing air back into the intake channel 242 and the piezoelectric pump 226 is formed without valves.

In operation, the control system 216 of the sample probe system 200 controls an arm or other robotic element to move the sample probe assembly 212 into position to collect a sample. For example, the control system 216 may be an element of the analyzer 10 (e.g., computer 15) and the sample probe assembly 212 corresponds to the liquid sampling probe 42 which is controlled through an automated movable arm. It should be understood, however, that other pipette apparatuses and immunoassay systems may incorporate one or more features disclosed.

The control system 216 is configured to apply voltage waveform to the piezoelectric element 252 via the electrical connection 254. The applied voltage is preferably between 6-20 V, but is not limited thereto. During testing, these voltages produced air flows with sufficient pressure and desirable flow rates at the sample probe 222. The applied voltage may be sufficient to produce ultrasonic oscillation of the diaphragm wall 248. For example, the voltage may be applied at a frequency of approximately 24-27 kHz. It should be understood, however, that the voltage waveform is not necessarily periodic. In some examples, an aperiodic voltage waveform may be applied.

The voltage waveform applied to the piezoelectric element 252 induces a pumping action which expels a constant, laminar air flow through the outlet nozzle 240. The ultrasonic oscillation induced in the diaphragm wall 248 produces micro-pulses within the outlet flow which are negligible and dissipate at the outlet nozzle 240 to produce pulsation-free air flow out of the outlet nozzle 240. The pulsation-free air flow reduces variation and allows the transducer 220 to reliably produce signals which are indicative of the relative location of the sample probe 222. The control system 216 communicates with the transducer 220 and performs an analysis through software to identify the location of the sample probe 222 and perform one or more actions, accordingly. For example, the control system 216 may cause a probe plunger to be activated by the sample pump 218 to draw a sample through a tip of the sample probe 222.

In some embodiments, the control system 216 further adjusts the voltage waveform based on the signals from the transducer 220 in order to tune the piezoelectric pump 226. For example, the transducer 220 may produce signals which are indicative of pressure oscillations at the sample probe 222 and the control system 216 may adjust the applied voltage waveform in order to reduce the pressure oscillations and better produce a smooth, laminar flow. In another example, the control system 216 may adjust the voltage waveform to compensate for detected deviations from a baseline. For example, the control system 216 may compare a flow rate or pressure of an air flow at the sample probe 222 to a threshold and adjust the input voltage to the piezoelectric pump 226. In this way, the control system 216 is configured to compensate for deviations caused by manufacturing biases, altitude, etc. In some embodiments, the control system 216 may alert a user when a deviation or unexpected value is detected at the sample probe 222. For example, the control system 216 may determine that a filter change is needed and alert a user.

The disclosed sample probe system incorporates a piezoelectric pump which produces a pulsation-free flow without the need for a pulsation dampening manifold or other device which reduces pulsation at the cost of additional components and space. As a result, the air supply assembly of the sample probe system is simplified with less components and may also occupy less space than conventional pumps, thereby promoting cost and space efficiency. The electronic control of the piezoelectric pump also allows for a feedback control which allows the sample probe system to overcome various conditions, including manufacturing biases and altitude, and to detect conditions such as a dirty filter.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable software application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) unless the element is expressly recited using the phrase "means for."

The invention claimed is:

1. A sample probe system, comprising:
a sample probe assembly comprising a transducer and a sample probe;
an air supply assembly comprising a piezoelectric air pump comprising a diaphragm that produces ultrasonic micro-pulses of air that dissipate at an outlet nozzle, such that the outlet nozzle supplies a constant pressure air flow directly to the sample probe assembly without an intervening pulse dampener, such that the air flow exits the sample probe; and
a control system configured to determine a relative location of the sample probe based on pressure changes in the air flow detected by the transducer.

2. The sample probe system of claim 1, wherein the sample probe comprises a probe plunger and a disposable tip.

3. The sample probe system of claim 1, wherein the sample probe assembly further comprises a sample pump.

4. The sample probe system of claim 1, wherein the air supply assembly further comprises an air filter.

5. The sample probe assembly of claim 1, wherein the air supply assembly further comprises one or more valves.

6. The sample probe assembly of claim 5, wherein the one or more valves comprises a pump valve and a bleed valve.

7. The sample probe assembly of claim 1, wherein the control system is configured to apply a voltage to the piezoelectric pump to produce the air flow.

8. The sample probe assembly of claim 7, wherein the control system further comprises a feedback control configured to adjust an applied voltage waveform based on signals from the transducer.

9. The sample probe assembly of claim 8, wherein adjusting the applied voltage includes adjusting at least one of an amplitude or a frequency of the applied voltage.

10. A sample probe system, comprising:
a sample probe assembly comprising a transducer and a sample probe;
an air supply assembly comprising a piezoelectric air pump comprising a diaphragm that produces ultrasonic micro-pulses of air that dissipate at an outlet nozzle, such that the outlet nozzle supplies a constant pressure air flow directly to the sample probe assembly without an intervening pulse dampener, such that the air flow exits the sample probe, wherein the piezoelectric pump comprises:
an outer housing comprising an inlet opening and an outlet nozzle;
an intake channel defined in the outer housing fluidly connected to the inlet opening; and
an inner pump positioned in the outer housing and configured to draw air in from the intake channel and expel air out of the outlet nozzle to produce the air flow to the sample probe assembly, the inner pump comprising piezoelectric element;
a control system configured to apply a voltage to the piezoelectric element in order to produce the air flow and determine a relative location of the sample probe based on pressure changes in the air flow detected by the transducer.

11. The sample probe system of claim 10, wherein the inner pump comprises a plurality of walls which define an air chamber fluidly connected to the intake channel.

12. The sample probe system of claim 11, wherein the plurality of walls comprise a diaphragm wall, the diaphragm wall being formed of a flexible material and being configured to change in shape based on the voltage applied to the piezoelectric element.

13. The sample probe system of claim 12, wherein the piezoelectric element is attached to the diaphragm wall.

14. The sample probe system of claim 12, wherein the piezoelectric element is integrally formed with the diaphragm wall.

15. The sample probe system of claim 10, wherein the control system further comprises a feedback control configured to adjust the applied voltage based on signals from the transducer.

16. The sample probe system of claim 10, wherein the applied voltage includes an amplitude of 6-20 V.

17. The sample probe system of claim 10, wherein the applied voltage includes a frequency of greater than 20 kHz.

* * * * *